(12) United States Patent
Duan et al.

(10) Patent No.: US 12,337,871 B2
(45) Date of Patent: Jun. 24, 2025

(54) VEHICLE SELF-PROTECTION METHOD AND SYSTEM, AND AUTONOMOUS DRIVING VEHICLE INCLUDING SYSTEM

(71) Applicant: Shenzhen Yinwang Intelligent Technologies Co., Ltd., Shenzhen (CN)

(72) Inventors: Xiaoming Duan, Shenzhen (CN); Anming Shi, Shenzhen (CN); Chunlei Liu, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 17/984,565

(22) Filed: Nov. 10, 2022

(65) Prior Publication Data

US 2023/0068712 A1 Mar. 2, 2023

Related U.S. Application Data

(63) Continuation of application No. PCT/CN2020/089523, filed on May 11, 2020.

(51) Int. Cl.
*B60W 60/00* (2020.01)
*B60W 40/02* (2006.01)
*B60W 40/12* (2012.01)

(52) U.S. Cl.
CPC ........ *B60W 60/0015* (2020.02); *B60W 40/02* (2013.01); *B60W 40/12* (2013.01); *B60W 2420/403* (2013.01); *B60W 2556/10* (2020.02); *B60W 2556/45* (2020.02)

(58) Field of Classification Search
CPC .. B60W 60/0015; B60W 40/02; B60W 40/12; B60W 2420/403; B60W 2556/10; B60W 2556/45
USPC .......................................................... 701/23
See application file for complete search history.

(56) References Cited

U.S. PATENT DOCUMENTS

| | | | |
|---|---|---|---|
| 7,151,440 B2* | 12/2006 | Chen | B60R 25/104 340/426.2 |
| 10,229,462 B2* | 3/2019 | Bogovich | H04W 4/029 |
| 10,831,204 B1* | 11/2020 | Fields | B60W 30/06 |
| 2006/0049921 A1* | 3/2006 | Hara | B60R 25/00 340/426.1 |
| 2008/0103640 A1* | 5/2008 | Watanabe | B60R 25/2018 701/2 |

(Continued)

FOREIGN PATENT DOCUMENTS

| CN | 201405780 Y | 2/2010 |
|---|---|---|
| CN | 103057519 A | 4/2013 |

(Continued)

*Primary Examiner* — Krishnan Ramesh
(74) *Attorney, Agent, or Firm* — Conley Rose, P.C.

(57) ABSTRACT

A vehicle self-protection method includes obtaining ambient environment information and historical information of the vehicle. The environment information may include information such as a location of the vehicle, a cabin temperature of the vehicle, an external temperature of the vehicle, a tire pressure of the vehicle, a water immersion depth, or intensity of a sound around the vehicle. The historical information may include historical driving information and historical parking information. The method includes determining a level of a risk faced by the vehicle based on the ambient environment information and the historical information.

18 Claims, 6 Drawing Sheets

(56) References Cited

U.S. PATENT DOCUMENTS

| | | | |
|---|---|---|---|
| 2012/0158228 A1* | 6/2012 | Biondo | B60L 3/12 701/22 |
| 2016/0082978 A1* | 3/2016 | Ozaki | G01C 21/34 701/58 |
| 2016/0159366 A1 | 6/2016 | Tsuyunashi et al. | |
| 2017/0329346 A1 | 11/2017 | Latotzki | |
| 2018/0154908 A1 | 6/2018 | Chen | |
| 2018/0186334 A1* | 7/2018 | Munafo | G06F 21/88 |
| 2020/0004269 A1* | 1/2020 | Oba | B60W 30/165 |
| 2020/0062249 A1* | 2/2020 | Light | G08G 1/017 |
| 2020/0142419 A1* | 5/2020 | Pohl | G05D 1/0246 |
| 2020/0152062 A1* | 5/2020 | Bender | G05D 1/0231 |
| 2020/0216063 A1* | 7/2020 | Lim | G08G 1/166 |
| 2020/0216097 A1* | 7/2020 | Galula | G06F 21/51 |
| 2021/0035426 A1* | 2/2021 | Grinberg | G08B 21/02 |
| 2021/0053561 A1* | 2/2021 | Beller | G08G 1/166 |
| 2021/0063179 A1* | 3/2021 | Hayes | G01C 21/3632 |
| 2021/0116907 A1* | 4/2021 | Altman | B60W 50/04 |
| 2021/0256472 A1* | 8/2021 | Javidan | G06Q 10/0833 |
| 2021/0331678 A1 | 10/2021 | Yi | |

FOREIGN PATENT DOCUMENTS

| | | |
|---|---|---|
| CN | 105491141 A | 4/2016 |
| CN | 107592504 A | 1/2018 |
| CN | 108357496 A | 8/2018 |
| CN | 109064002 A | 12/2018 |
| CN | 110259321 A | 9/2019 |
| CN | 209336671 U | 9/2019 |
| CN | 110673599 A | 1/2020 |
| CN | 110796834 A | 2/2020 |
| CN | 110807565 A | 2/2020 |
| CN | 110816441 A | 2/2020 |
| DE | 102018218845 A1 | 5/2020 |
| KR | 20190100103 A | 8/2019 |
| WO | 2017020142 A | 2/2017 |
| WO | 2019233766 A1 | 12/2019 |

* cited by examiner

VEHICLE SELF-PROTECTION METHOD AND SYSTEM, AND AUTONOMOUS DRIVING VEHICLE INCLUDING SYSTEM

CROSS-REFERENCE TO RELATED APPLICATIONS

This application is a continuation of International Patent Application No. PCT/CN2020/089523 filed on May 11, 2020, which is hereby incorporated by reference in its entirety.

TECHNICAL FIELD

The present disclosure relates to the autonomous driving field, in particular, to a vehicle self-protection method and system, and an autonomous driving vehicle including the system.

BACKGROUND

With the development of science and technology, vehicles have become the most important and frequently used transportation means in people's life. Vehicles have been widely used by thousands of households and become an important part of people's daily life. Development of autonomous driving enables vehicles to have an autonomous driving function. In addition, with a requirement for energy saving and emission reduction, vehicles are gradually electrified, and a proportion of electric vehicles (including hybrid electric vehicles, plug-in hybrid electric vehicles, and pure electric vehicles) in the market is gradually increasing.

In daily life, situations that threaten normal availability of vehicles may often be encountered, especially when vehicle owners are not on site or cannot arrive at the site in time. For example, if a vehicle is parked in a low-lying place during a rainstorm, the vehicle may be flooded with water, and consequently the engine and battery of the vehicle may be damaged and cannot work properly. As another example, if the temperature keeps high, the cabin temperature may be high and the vehicle may encounter spontaneous combustion. A high temperature may cause the vehicle to have a flat tire. In these cases, the damage to the vehicle and the economic loss to the owner are caused. In addition, with the popularization of electric vehicles, a proportion of pure electric vehicles in the vehicle market is increasing day by day. A pure electric vehicle usually includes a battery pack, and a voltage of the battery pack is usually high (about hundreds of volts). If a pure electric vehicle is flooded, electricity leakage may occur, and life safety of pedestrians or animals around the vehicle may be threatened.

To address the foregoing problems, a method is required to reduce a property loss and eliminate security risks as much as possible.

SUMMARY

To address the foregoing related problems, embodiments of the present disclosure provide a vehicle self-protection method and system, and an autonomous driving vehicle using the system.

According to a first aspect of the present disclosure, a vehicle self-protection method is provided. The method includes obtaining ambient environment information of a vehicle and historical information of the vehicle; determining a risk level based on at least the ambient environment information of the vehicle and the historical information of the vehicle; and performing a corresponding operation based on the risk level. The ambient environment information may include information such as a current location of the vehicle, a cabin temperature of the vehicle, an external temperature of the vehicle, a tire pressure of the vehicle, a water immersion depth, or intensity of a sound around the vehicle. The historical information of the vehicle includes historical driving information of the vehicle and historical parking information of the vehicle. After the ambient environment information of the vehicle and historical information of the vehicle are obtained, the level of the risk faced by the vehicle can be determined, for example, a low risk level, a medium risk level, and a high risk level. After the risk level is determined, a corresponding operation can be performed to avoid a vehicle risk. The corresponding operation includes but is not limited to the following. If the risk level is low, a notification is sent to a vehicle owner. If the risk level is high, the vehicle may enable autonomous driving to leave the current location. If the risk level is medium, the vehicle may enable autonomous driving to leave the current location when no response is received from the vehicle owner within a specified time range, or leave the current location under remote control of the vehicle owner. In the present disclosure, a risk level currently faced by the vehicle is determined by comprehensively evaluating the ambient environment information of the vehicle and the historical information of the vehicle, and a corresponding operation is performed based on different risk levels, so that the vehicle can perform a proper operation to avoid a risk faced by the vehicle, so that a property loss and a personal safety hazard can be further avoided.

In a possible design, the risk level may be comprehensively determined based on information stored on the cloud, the ambient environment information of the vehicle, and the historical information of the vehicle. A cloud is communicatively connected to the vehicle, and the cloud may be, for example, a public cloud, a private cloud, or a hybrid cloud provided by a cloud computing service provider. The information stored on the cloud includes information uploaded by another vehicle to the cloud, related statistical information of a current location of the vehicle, and weather information at a current time. By introducing the information stored on the cloud, the level of the risk faced by the vehicle can be more accurately evaluated. Risk level determining may be completed on the vehicle end or on the cloud.

In a possible design, after the level of the risk faced by the vehicle is determined, a corresponding operation that may be selected includes, but is not limited to, sending a notification to the vehicle owner, leaving the current location under remote control of the vehicle owner, or leaving the current location through autonomous driving. It should be understood that, usually, sending a notification to the vehicle owner is a preliminary warning or corresponds to a low-level risk. However, leaving the current location through autonomous driving corresponds to a high-level risk and a case in which no reply from the vehicle owner is obtained after the notification is sent. If no action is taken, vehicle damage may occur or even personal safety may be threatened.

In a possible design, if the corresponding operation to be performed is leaving the current location through autonomous driving, after the operation is completed, a notification is sent to the vehicle owner to notify the vehicle owner of a current location of the vehicle. In this way, the vehicle owner may know the current location of the vehicle.

In a possible design, when the vehicle performs the operation of leaving the current location through autonomous driving, a target parking location is determined based on the historical information of the vehicle. For example, a parking area near a residential location or a working location of the vehicle owner may be determined as the target parking location. In this way, after the vehicle owner is notified, it may be convenient for the vehicle owner to get the vehicle.

In a possible design, after completing the corresponding operation, the vehicle may upload the ambient environment information of the vehicle, the risk level, and related information of the corresponding operation to the cloud to serve as a training dataset of the cloud, so that a machine learning model on the cloud can obtain more training data, to improve accuracy of determining and prediction.

According to a second aspect, a vehicle self-protection system is provided, including a plurality of sensors such as a temperature sensor, a tire pressure sensor, a water immersion sensor, a sound sensor; a camera; a global navigation satellite system (GNSS), where the global navigation satellite system currently includes a Global Positioning System of the United States, a Global Navigation Satellite System (GLONASS) of Russia, a Galileo satellite navigation system of Europe, and a BeiDou navigation satellite system of China and the vehicle self-protection system may include one or more of the foregoing navigation systems; and an analysis control unit communicatively connected to the plurality of sensors, the camera, and the positioning apparatus, where the analysis control unit determines a risk level based on ambient environment information of the vehicle obtained from the plurality of sensors, the camera, and the GNSS and historical information of the vehicle obtained from the vehicle, and performs a corresponding operation based on the risk level.

It may be understood that the system provided in the second aspect corresponds to the method provided in the first aspect. Therefore, for implementations of the second aspect and technical effects that can be achieved by the implementations of the second aspect, refer to related descriptions of the implementations of the first aspect.

According to a third aspect, a vehicle self-protection apparatus is provided, including a storage unit and a processing unit, where the storage unit is configured to store program instructions, and the processing unit is configured to execute the program instructions in the storage unit to implement various functions in the first aspect. The storage unit may be a memory, for example, a volatile memory, and is configured to cache these program instructions. These program instructions may be loaded from another non-volatile memory to the storage unit when the method provided in the first aspect is performed. Certainly, the storage unit may alternatively be a non-volatile memory, and is also integrated inside a chip. The processing unit may be a processor, for example, one or more processing cores of the chip.

According to a fourth aspect, a computer-readable storage medium is provided, where the computer-readable storage medium stores program code. When the program code is executed by a computer or a processor, various functions in the first aspect can be implemented.

According to a fifth aspect, an autonomous driving vehicle is provided, including the vehicle self-protection system in the second aspect.

Embodiments of the present disclosure provide a vehicle self-protection method and system, and an autonomous driving vehicle using the system. A level of a risk faced by a vehicle is determined by obtaining and analyzing ambient environment information of the vehicle and historical information of the vehicle, and a corresponding operation is performed based on the risk level. The corresponding operation may include notifying a vehicle owner; leaving the current location under remote control of the vehicle owner when a remote control command from the vehicle owner is obtained; or leaving the current location through autonomous driving, and notifying the vehicle owner of a current location of the vehicle after the autonomous driving is completed. In the technical solutions of the present disclosure, when a vehicle faces an actual environment danger, the vehicle can independently perform a corresponding protection measure, so that property of an owner can be protected and a personal safety threat can be reduced.

DESCRIPTION OF EMBODIMENTS

Figure 1:
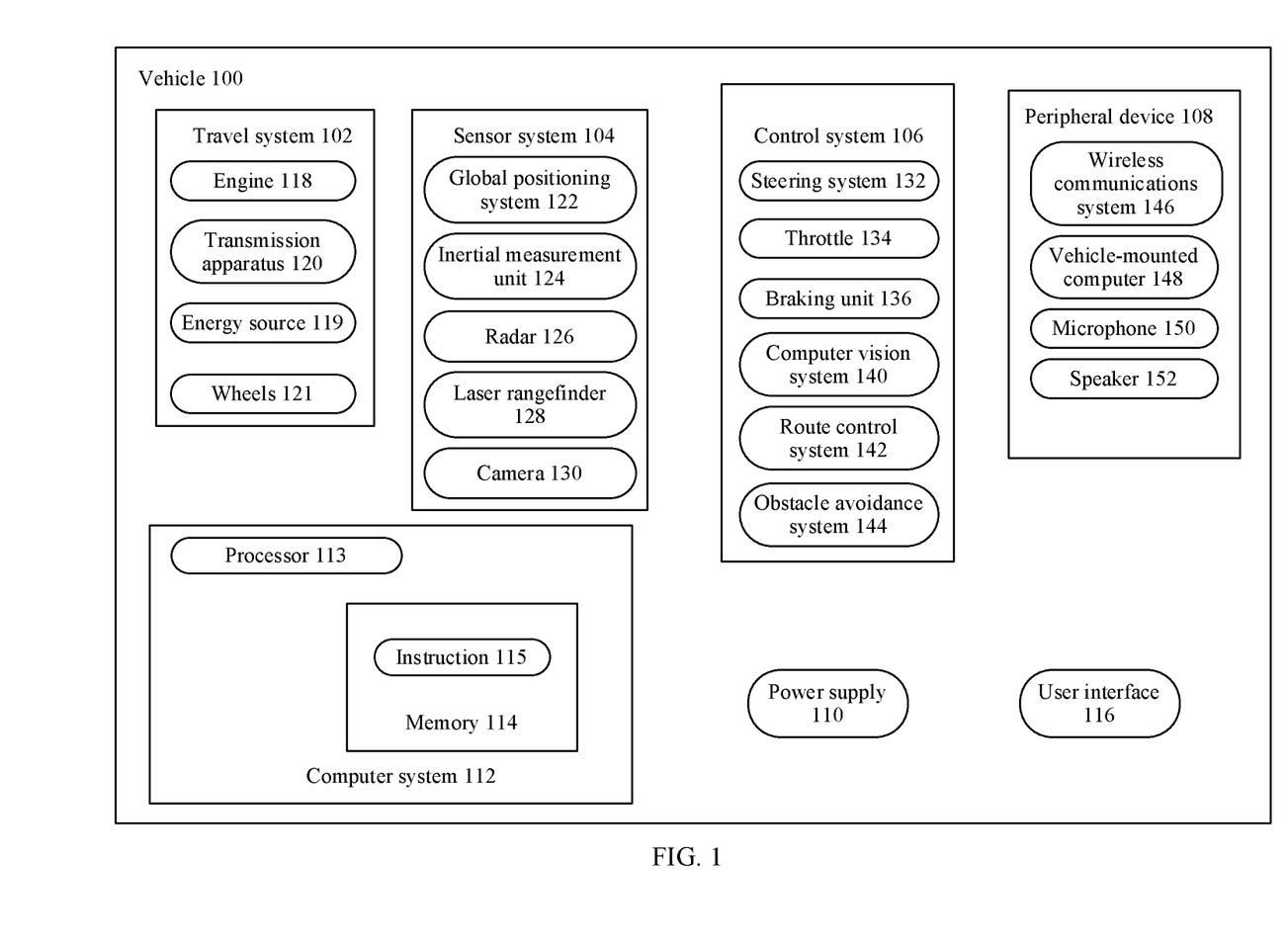
FIG. 1 is a schematic diagram of an architecture of a vehicle according to an embodiment of the present disclosure.

FIG. 1 is a functional block diagram of a vehicle according to an embodiment of the present disclosure. In an embodiment, the vehicle 100 is configured to be in a fully autonomous driving mode or a partially autonomous driving mode. For example, if the vehicle 100 is configured to be in the partially autonomous driving mode, in the autonomous driving mode, the vehicle 100 may further determine a current situation of the vehicle and an ambient environment of the vehicle through manual operations, determine a possible behavior of at least one vehicle in the ambient environment, determine a confidence level corresponding to a possibility that another vehicle is going to execute a possible behavior, and control the vehicle 100 based on the determined information. When the vehicle 100 is in the autonomous driving mode, the vehicle 100 may be configured to operate without interacting with a person. The vehicle 100 may include various subsystems, for example, a travel system 102, a sensor system 104, a control system 106, one or more peripheral devices 108, a power supply 110, a computer system 112, and a user interface 116. In some embodiments, the vehicle 100 may include more or fewer subsystems, and each subsystem may include a plurality of elements. In addition, all the subsystems and elements of the vehicle 100 may be interconnected in a wired or wireless manner.

The travel system 102 may include a component providing power to the vehicle 100 for moving. In an embodiment, the travel system 102 may include an engine 118, an energy source 119, a transmission apparatus 120, and wheels/tires 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, and other power sources. The energy source 119 may also provide energy to another system of the vehicle 100.

The transmission apparatus 120 may transmit mechanical power from the engine 118 to the wheels 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that can sense information about the ambient environment of the vehicle 100. For example, the sensor system 104 may include a positioning system 122 (for example, may be any one or more of a GPS system, a BeiDou system, a Galileo system, and a GLONASS system), an inertial measurement unit (IMU) 124, radar 126, a laser rangefinder 128, and a camera 130. The sensor system 104 may further include a sensor (for example, an in-vehicle air quality monitor, a fuel gauge, or an engine oil thermometer) of an internal system of the monitored vehicle 100. Sensor data from one or more of these sensors can be used to detect an object and corresponding features (a position, a shape, a direction, a speed, and the like) of the object. Such detection and recognition are key functions of a safe operation of the autonomous vehicle 100.

The positioning system 122 may be configured to estimate a geographic location of the vehicle 100. The IMU 124 is configured to sense location and orientation changes of the vehicle 100 based on an inertial acceleration. In an embodiment, the IMU 124 may be a combination of an accelerometer and a gyroscope.

The radar 126 may sense an object in the ambient environment of the vehicle 100 through a radio signal. In some embodiments, in addition to sensing an object, the radar 126 may further be configured to sense a speed and/or a moving direction of the object.

The laser rangefinder 128 may sense, by using a laser, an object in an environment in which the vehicle 100 is located. In some embodiments, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 controls operations of the vehicle 100 and components of the vehicle 100. The control system 106 may include various elements, including a steering system 132, a throttle 134, a braking unit 136, a computer vision system 140, a route control system 142, and an obstacle avoidance system 144.

The steering system 132 may be operated to adjust a moving direction of the vehicle 100. For example, in an embodiment, the steering system 132 may be a steering wheel system.

The throttle 134 is configured to control an operating speed of the engine 118 and further control a speed of the vehicle 100.

The braking unit 136 is configured to control the vehicle 100 to decelerate. The braking unit 136 may use friction to slow down the wheels 121. In another embodiment, the braking unit 136 may convert kinetic energy of the wheels 121 into a current. Alternatively, the braking unit 136 may reduce a rotational speed of the wheels 121 in another form to control the speed of the vehicle 100.

The computer vision system 140 may be operated to process and analyze an image captured by the camera 130, to recognize an object and/or a feature in the ambient environment of the vehicle 100. The object and/or the feature may include a traffic signal, a road boundary, and an obstacle. The computer vision system 140 may use an object recognition algorithm, a structure from motion (SFM) algorithm, video tracking, and another computer vision technology. In some embodiments, the computer vision system 140 may be configured to draw a map for an environment, track an object, estimate a speed of the object, and the like.

The route control system 142 is configured to determine a driving route of the vehicle 100. In some embodiments, the route control system 142 may combine data from the sensor, the GPS 122, and one or more predetermined maps to determine the driving route of the vehicle 100.

The obstacle avoidance system 144 is configured to identify, evaluate, and avoid or bypass, in another manner, a potential obstacle in the environment of the vehicle 100.

Certainly, in an example, the control system 106 may add or alternatively include components in addition to those shown and described. Alternatively, the control system 106 may remove some of the components shown above.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information to the user of the vehicle 100. The user interface 116 may further operate the vehicle-mounted computer 148 to receive an input from the user. The vehicle-mounted computer 148 may perform an operation by using a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. Likewise, the speaker 152 may output audio to the user of the vehicle 100.

The wireless communications system 146 may wirelessly communicate with one or more devices directly or through a communications network. For example, the wireless communications system 146 may use third-generation (3G) cellular communication such as code-division multiple access (CDMA), evolution-data optimized (EVDO), Global System for Mobile Communications (GSM)/general packet radio service (GPRS), or fourth-generation (4G) cellular communication such as Long-Term Evolution (LTE), or fifth-generation (5G) cellular communication. The wireless communications system 146 may communicate with a wireless local area network (WLAN) by using wireless fidelity (Wi-Fi). In some embodiments, the wireless communications system 146 may directly communicate with a device by using an infrared link, Bluetooth, or a ZigBee protocol. Other wireless protocols, for example, various vehicle communications systems, such as the wireless communications system 146, may include one or more dedicated short range communications (DSRC) devices, and these devices may include public and/or private data communication between the vehicle and/or roadside stations.

The power supply 110 may provide power to various components of the vehicle 100. In an embodiment, the power supply 110 may be a rechargeable lithium-ion or lead-acid battery. One or more battery packs of such batteries may be configured as the power supply to supply power to the components of the vehicle 100. In some embodiments, the power supply 110 and the energy source 119 may be implemented together, for example, in some pure electric vehicles.

Some or all of functions of the vehicle 100 are controlled by the computer system 112. The computer system 112 may include at least one processor 113. The processor 113 executes instructions 115 stored in a non-transient computer-readable medium such as a data storage apparatus 114. The computer system 112 may alternatively be a plurality of computing devices that control an individual component or a subsystem of the vehicle 100 in a distributed manner.

The processor 113 may be any conventional processor, such as a commercially available central processing unit (CPU). Alternatively, the processor may be an application-specific integrated circuit (ASIC) for specialized applications or another dedicated device such as a hardware-based processor. A person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer. Thus, it is understood that a reference to the processor or the computer includes a reference to a set of processors or computers or memories that may or may not operate in parallel. Different from using a single processor to perform the steps described herein, some components, such as a steering component and a deceleration component, each may include a respective processor that performs only computation related to a component-specific function.

In various aspects described herein, the processor may be located far away from the vehicle and communicate wirelessly with the vehicle. In another aspect, some processes described herein are performed on a processor disposed inside the vehicle, while others are performed by a remote processor, including taking steps necessary for single manipulation.

In some embodiments, the data storage apparatus 114 may include the instructions 115 (for example, program logic), and the instructions 115 may be executed by the processor 113 to perform various functions of the vehicle 100, including the functions described above. The data storage apparatus 114 may further include additional instructions, including instructions for sending data to, receiving data from, interacting with, and/or controlling one or more of the travel system 102, the sensor system 104, the control system 106, and the peripheral device 108.

In addition to the instructions 115, the data storage apparatus 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode.

The user interface 116 is used to provide information for or receive information from the user of the vehicle 100. In some embodiments, the user interface 116 may include one or more input/output devices in a set of peripheral devices 108, for example, the wireless communications system 146, the vehicle-mounted computer 148, the microphone 150, and the speaker 152.

The computer system 112 may control functions of the vehicle 100 based on input received from various subsystems (for example, the travel system 102, the sensor system 104, and the control system 106) and from the user interface 116. For example, the computer system 112 may access and use input from the control system 106 to control the steering unit 132 to avoid an obstacle detected by the sensor system 104 and the obstacle avoidance system 144. In some embodiments, the computer system 112 may be operated to provide control over many aspects of the vehicle 100 and the subsystems of the vehicle 100.

In some embodiments, one or more of the foregoing components may be installed separately from or associated with the vehicle 100. For example, the data storage apparatus 114 may exist partially or completely separate from the vehicle 100. The foregoing components may be communicatively coupled together in a wired and/or wireless manner.

Figure 4:
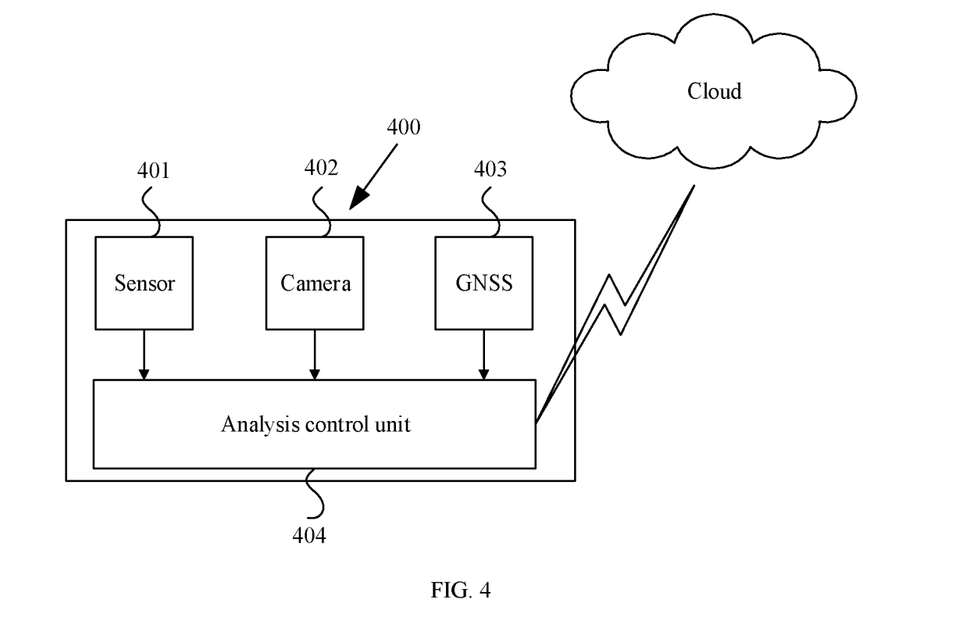
FIG. 4 is a schematic diagram of an architecture of a vehicle self-protection system according to an embodiment of the present disclosure.

In some embodiments, the foregoing components are merely examples. In actual application, components in the foregoing modules may be added or deleted based on an actual requirement. FIG. 4 should not be understood as any limitation on embodiments of the present disclosure.

An autonomous vehicle traveling on a road, such as the vehicle 100, may identify an object in an ambient environment of the vehicle 100 to determine to adjust a current speed. The object may be another vehicle, a traffic control device, or another object of another type. In some examples, the autonomous vehicle may separately consider each identified obstacle, and determine an adjusted speed of the autonomous vehicle based on characteristics of each identified obstacle such as a current speed, an acceleration, and a distance between the autonomous vehicle and the obstacle.

In some embodiments, the autonomous vehicle 100 or a computing device associated with the autonomous vehicle 100 (such as the computer system 112, the computer vision system 140, and the data storage apparatus 114 in FIG. 4) may predict a behavior of an identified obstacle based on characteristics of the identified obstacle and statuses of the ambient environment (for example, traffic, rain, or ice on the road). In some embodiments, each of the identified obstacles depends on a behavior of each other, and therefore a behavior of a single identified obstacle may be predicted by considering behavior of all identified obstacles. The vehicle 100 can adjust its speed based on the predicted behavior of the identified object. In other words, the autonomous vehicle can determine, based on the predicted behavior of the object, a specific adjustment (for example, acceleration, deceleration, or stop). In this process, another factor, for example, a transverse location of the vehicle 100 on a road on which the vehicle 100 moves, a curvature of the road, or proximity between static and dynamic objects, may also be considered, to determine the speed of the vehicle 100.

In addition to providing an instruction for adjusting the speed of the autonomous vehicle, the computing device may further provide an instruction for modifying a steering angle of the vehicle 100, so that the autonomous vehicle can follow a given track and/or maintain safe horizontal and vertical distances from an obstacle (for example, a vehicle in a neighboring lane on the road) near the autonomous vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in this embodiment of the present disclosure.

Figure 2:
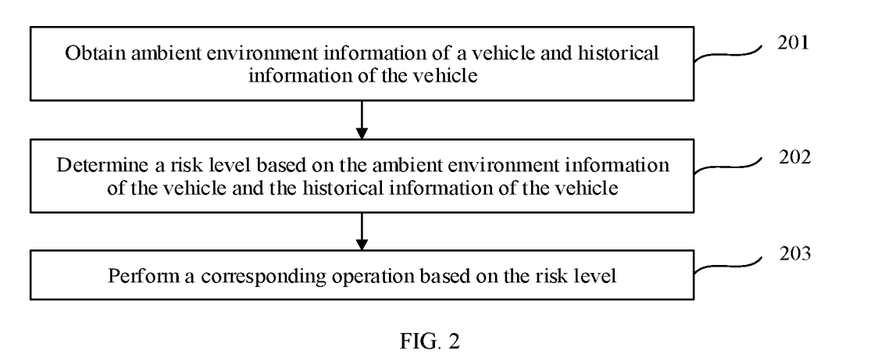
FIG. 2 is a schematic flowchart of a vehicle self-protection method according to an embodiment of the present disclosure.

FIG. 2 is a schematic flowchart of a vehicle self-protection method according to an embodiment of the present disclosure. The method includes the following steps.

201: Obtain ambient environment information of a vehicle and historical information of the vehicle. The ambient environment information of the vehicle may include a location of the vehicle (the location may be obtained by using, for example, a GNSS), a cabin temperature of the vehicle, an external temperature of the vehicle, a tire pressure of the vehicle, whether the vehicle is in a water accumulation area, a depth of water accumulation around the vehicle if the vehicle is in a water accumulation area, intensity of a sound around the vehicle, image and video information around the vehicle, and the like. It should be understood that the ambient environment information of the vehicle is generally information obtained when the vehicle is parked statically. The historical information of the vehicle includes historical driving information of the vehicle and historical parking information of the vehicle. The historical driving information of the vehicle may include a driving record of the vehicle in a time period (for example, one week). The historical parking information of the vehicle may include parking information of the vehicle in a time period (for example, one week). For example, a vehicle departs from a residential location of a vehicle owner at about 8:00 a.m. every day from Monday to Friday, travels to a parking lot of a working location of the vehicle owner, parks in the parking lot of the working location for about 10 hours, and then travels back to the residential location of the vehicle owner at about 6:00 p.m. from the working location of the vehicle owner.

202: Determine a risk level based on the ambient environment information of the vehicle and the historical information of the vehicle. After the ambient environment information of the vehicle and the historical information of the vehicle are obtained, a risk of the environment in which the vehicle is currently located may be determined based on the information. For example, if the vehicle is currently parked in a high-temperature environment, the vehicle may face a risk of tire burst. As another example, if the vehicle is currently parked in a water accumulation area, the accumulated water is deep, and it is still raining, the vehicle may face a risk of being flooded. For another example, if intensity of a sound around the vehicle is high, the vehicle may be in an environment in which fireworks and firecrackers are set off, and the vehicle may face a risk of being ignited by fireworks and firecrackers. For another example, if the vehicle is a pure electric vehicle and the vehicle is in a high-temperature environment for a long time, a battery of the vehicle may have a risk of spontaneous combustion due to overheating. In addition, a voltage of a battery pack of the pure electric vehicle is usually high and if the battery pack encounters water immersion, electricity leakage may occur, and personal safety of people around the vehicle may be threatened. Historical information of a vehicle should be considered to evaluate a risk level. For example, when a risk level of a vehicle is evaluated during working hours on working days, information about a parking lot at a working location of a vehicle owner may be added. For example, the information may include whether the parking lot at the working location is an open parking lot (which may be obtained by analyzing an image obtained by a camera of the vehicle) and whether the vehicle owner parks the vehicle for a long time every day. If the parking lot is an open parking lot, the vehicle (or a battery of the vehicle) is prone to encounter self-ignition due to overheating when the vehicle is parked in the open parking lot for a long time in summer. The determined risk level may include a low risk level, a medium risk level, and a high risk level.

Logic for determining the risk level may be formulated in advance according to a rule, or may be obtained based on big data learning by using, for example, a machine learning method. Some examples of risk level determining scenarios may include, but are not limited to, if a vehicle is currently in a high-temperature environment, but a tire pressure of the vehicle is not high and a current time is close to the evening, it may be determined that a risk of tire burst of the vehicle is low; or if the vehicle is currently in a high-temperature environment, and the tire pressure of the vehicle is very high and a current time is at noon, it may be determined that a risk of tire burst of the vehicle is high.

203: Perform a corresponding operation based on the risk level after the risk level is obtained based on step 202. The corresponding operation may include sending a notification to a vehicle owner, leaving a current location under remote control of the vehicle owner, or leaving the current location through autonomous driving. Details are described below.

If it is determined that the level of the risk faced by the vehicle is low or medium, an alarm notification may be sent to the vehicle owner, and the alarm notification may be sent to a mobile phone of the vehicle owner. The vehicle may send an alarm notification to the mobile phone of the vehicle owner, or an alarm notification may be sent to the mobile phone of the vehicle owner through a cloud.

After receiving the alarm notification, the vehicle owner may determine, based on an alarm status, an operation to be performed or choose to ignore the notification. If the vehicle is a vehicle with an autonomous driving function, the vehicle owner may choose to remotely control the vehicle to leave the current location.

Similarly, if the vehicle has an autonomous driving function, and if it is determined that a risk level currently faced by the vehicle is high, and no reply or feedback is received within a specified time period after the vehicle sends an alarm to the vehicle owner, the vehicle may face a very high vehicle loss risk if the vehicle does not move away from the current location as soon as possible. In this case, the vehicle may enable the autonomous driving function to leave the current location, or leave the current location under control of the cloud by sending instructions. After the vehicle is parked at a new location, information about the new location of the vehicle is sent to the vehicle owner. The vehicle owner may also send a location of the vehicle owner to the vehicle, and the vehicle moves to the location of the vehicle owner through autonomous driving.

In some embodiments, before the vehicle leaves the current location through autonomous driving, a permission needs be obtained in a form of authorization by the vehicle owner. To be specific, when the vehicle faces a high-level risk and does not obtain a reply or feedback from the vehicle owner in time, the vehicle may leave the current location through autonomous driving. The permission may be one-time, or may be valid within a period of time.

In some embodiments, historical information of the vehicle may be further used. To be specific, when the vehicle faces a high-level risk and does not receive a reply or feedback from the vehicle owner within a specified time period, the vehicle may enable an autonomous driving function and select a parking location included in the historical information of the vehicle as a destination, for example, may select a parking lot near a residential location or a working location of the vehicle owner as the destination.

In some embodiments, when the vehicle leaves the current location through autonomous driving, a speed limiting measure is taken on the vehicle. For example, a vehicle speed may be limited to less than 30 km/h, to reduce a risk.

It should be understood that operations corresponding to risk levels of different risk types may be different. For example, if the vehicle is a pure electric vehicle, because a voltage of a power battery pack of the vehicle is high, a person or an animal around the vehicle may encounter an electric shock and face a life hazard if the vehicle is immersed in water. Therefore, for a pure electric vehicle, if it is determined that a risk level of water immersion is medium, and no reply or feedback from the vehicle owner is obtained within a short time range (for example, 30 minutes), the vehicle may enable an autonomous driving function to leave the current location. However, if a determined risk level of tire burst is medium, and no reply or feedback from the vehicle owner is obtained within a short time range (for example, 30 minutes), the vehicle does not need to enable an autonomous driving function to leave the current location immediately.

In some embodiments, the vehicle may communicate with a cloud, the ambient environment information of the vehicle and the historical information of the vehicle may be transmitted to the cloud, and the information stored on the cloud may also be transmitted to the vehicle. Therefore, the vehicle may obtain the ambient environment information and the information stored on the cloud. The information stored on the cloud includes but is not limited to:

(1) Information uploaded by another vehicle to the cloud.
   In some embodiments, after obtaining the current location information of the vehicle, the cloud may obtain data that has been transmitted by another vehicle at the location and in an area near the location to the cloud, for example, a road condition of the location and the area near the location.
(2) Related statistics information of the current location of the vehicle, for example, a traffic accident situation and a public security situation of the current location of the vehicle and an area near the current location of the vehicle.
(3) Weather information, including a weather condition of the current location of the vehicle and a weather forecast within several time segments (for example, within two hours).

In some embodiments, the information stored on the cloud may be transmitted to the vehicle, and the vehicle may determine a risk based on the ambient environment information of the vehicle, the historical information of the vehicle, and the obtained information from the cloud. Because the information stored on the cloud is available, a risk level can be evaluated more accurately. For example, the foregoing example is used again. If a vehicle is currently in a high-temperature environment, but a tire pressure of the vehicle is already very high and a current time is at noon, it may be determined that a risk of tire burst of the vehicle is high based on only these pieces of information. However, if the information stored on the cloud is obtained, the information stored on the cloud includes a weather condition, and the weather condition shows that there is a high probability of rainfall at a location of the vehicle in the next two hours, it may be determined that the risk of tire burst of the vehicle is medium.

In some embodiments, more scenario-based evaluations may be further performed on the level of the risk faced by the vehicle based on the ambient environment information of the vehicle, the historical information of the vehicle, and the information stored on the cloud. For example, if the historical information of the vehicle shows that the vehicle is parked at a fixed parking location for a long time (for example, from 8:00 p.m. to 12:00 p.m.) every Saturday night in the past month, when the vehicle is parked at this location on Saturday night, related statistical information of the current location of the vehicle on the cloud shows that a public security situation near the location is poor recently, and there are many vehicle theft cases, it can be determined that the vehicle is currently facing a high-level risk of being stolen.

In some embodiments, the vehicle may upload the obtained ambient environment information and historical information of the vehicle to the cloud. The cloud determines, based on the ambient environment information of the vehicle, the level of the risk faced by the vehicle. After the cloud completes evaluation, the cloud transmits the risk level to the vehicle by using a communications network.

In some embodiments, the vehicle may upload the obtained ambient environment information and historical information of the vehicle to the cloud, and the cloud comprehensively determines the level of the risk faced by the vehicle with reference to the ambient environment information of the vehicle and the information stored on the cloud. The cloud may evaluate, based on big data analysis by using a machine learning method or the like, the level of the risk currently faced by the vehicle, and transmit the risk level to the vehicle by using a communications network after the cloud completes the evaluation.

In some embodiments, the alarm notification sent to the vehicle owner may include a picture or a video that is of the ambient environment of the vehicle and that is obtained based on a camera. The vehicle owner may learn a current situation of the vehicle based on the picture and the video of the ambient environment of the vehicle, and may have an objective determining basis for the alarm notification.

In some embodiments, after completing the corresponding operation, the vehicle may upload the ambient environment information of the vehicle, the risk level, and related information of the corresponding operation to the cloud to serve as a training dataset of the cloud, so that a machine learning model on the cloud can obtain more training data, to improve accuracy of determining and prediction.

It should be understood that privacy-related data is encrypted and filtered when the information in the foregoing embodiments is uploaded to the cloud.

In an embodiment, the vehicle is a pure electric vehicle. The risk level is determined based on the ambient environment information of the vehicle. After the ambient environment information of the vehicle is obtained, if the ambient environment of the vehicle is rainy and there is a large amount of accumulated water around the vehicle, it is determined that the vehicle faces a medium risk. The medium risk has two meanings. First, a battery and an electrical system of the vehicle may be damaged due to water immersion. Second, a high-voltage part of a battery pack of the pure electric vehicle (a voltage of the battery pack of the pure electric vehicle is usually high, about hundreds of volts) may cause electricity leakage due to water immersion, which further threatens the safety of life bodies (humans or animals) near the vehicle. In this scenario, the pure electric vehicle may perform one or more of the following operations: (1) Sending a warning to the surroundings in a form of flash or sound, indicating that the surroundings of the vehicle are dangerous areas and should be avoided; (2) Sending a notification to a traffic management department to notify the (medium) potential risk of the vehicle; (3) Sending a notification to the vehicle owner to notify that immediate action should be taken to avoid risks. After the pure electric vehicle performs one or more of the foregoing operations, for example, performs (3), if no reply or remote control vehicle moving instruction is received from the vehicle owner within a predetermined time range (for example, half an hour), and the pure electric vehicle is still in a rainy environment, the pure electric vehicle raises a risk level to a high level, and enables an autonomous driving function to leave the current environment. When determining a destination parking location, the vehicle may select, based on map information, a non-open parking lot such as an indoor parking lot or an underground parking lot. The selected parking lot may be determined based on the historical information of the vehicle stored in the vehicle. For example, an underground parking lot of a community in which the owner's family is living may be selected. If there is no underground parking lot in the community in which the owner's family is living, an underground parking lot of a shopping mall near the community in which the owner's family is living may be selected. After the vehicle travels to the destination parking location, the vehicle sends a notification to the vehicle owner to notify the vehicle owner of a current location of the vehicle. In other cases, if the vehicle performs (2) and (3) and does not receive a reply or a remote control vehicle moving instruction from the vehicle owner within a predetermined time range (for example, 20 minutes), the vehicle further sends a request to the traffic management department, notifying the traffic management department that the potential risk faced by the vehicle is a high level risk, and requesting the traffic management department to contact the vehicle owner. If the vehicle does not receive a reply from the traffic management department or a reply from the vehicle owner within a predetermined time range (for example, 10 minutes) after sending the request to the traffic management department, the vehicle further performs the foregoing autonomous driving process to leave the current location and search for a proper destination parking location.

Figure 3:
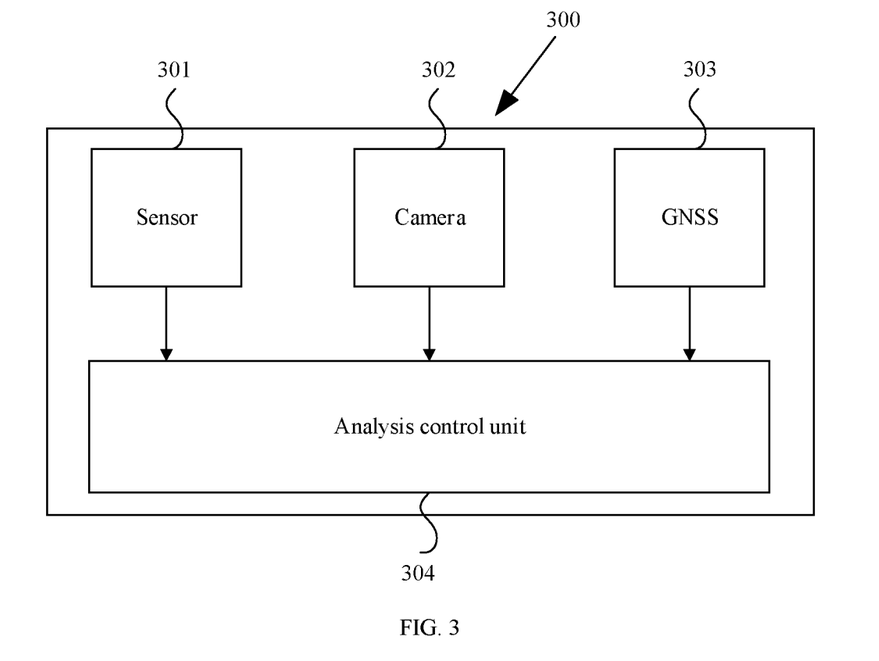
FIG. 3 is a schematic diagram of an architecture of a vehicle self-protection system according to an embodiment of the present disclosure.

FIG. 3 shows a vehicle self-protection system 300 based on some embodiments. The vehicle self-protection system 300 may be a vehicle-mounted system. The vehicle self-protection system 300 includes a sensor 301, where the sensor may include a temperature sensor, a tire pressure sensor, a water immersion sensor, a sound sensor, and the like; a camera 302, where there may be a plurality of cameras; a GNSS 303; and an analysis control unit 304 communicatively connected to the sensor 301, the camera 302, and the GNSS 303.

The sensor 301 is configured to obtain temperature information, tire pressure information, water immersion information, and sound information of the vehicle. The camera is configured to obtain image and video information inside and outside the vehicle. The GNSS is configured to obtain location information of the vehicle.

In some embodiments, information obtained by the sensor 301, the camera 302, and the GNSS 303 may be transmitted to the analysis control unit 304. The analysis control unit 304 may further obtain historical information of the vehicle from the vehicle (for example, obtain the historical information from a storage apparatus disposed on the vehicle to record a historical behavior of the vehicle). After obtaining the foregoing ambient environment information of the vehicle and/or historical information of the vehicle, the analysis control unit 304 may evaluate a current risk level of the vehicle either individually or in combination with these pieces of information. The evaluation process is consistent with various implementations in step 202. After the evaluation is completed, the analysis control unit may further perform an operation corresponding to the risk level.

Refer to FIG. 4. In some embodiments, a vehicle self-protection system 400 that is the same as that in the embodiment shown in FIG. 3 may communicate with a cloud. Information (for example, current location information of the vehicle and/or historical information of the vehicle) of the vehicle may be transmitted to the cloud, and information stored on the cloud may also be transmitted to the vehicle. Therefore, the vehicle may obtain the ambient environment information, the historical information of the vehicle, and the information stored on the cloud. Both the vehicle and the cloud may determine the risk level based on the foregoing information (including the current location information of the vehicle, the historical information of the vehicle, and the information stored on the cloud). A process in which the vehicle interacts with the cloud and a process in which the risk level is determined are consistent with the implementations recorded in step 202. After the risk level is determined, the analysis control unit or the cloud may further perform an operation corresponding to the risk level.

Figure 5:
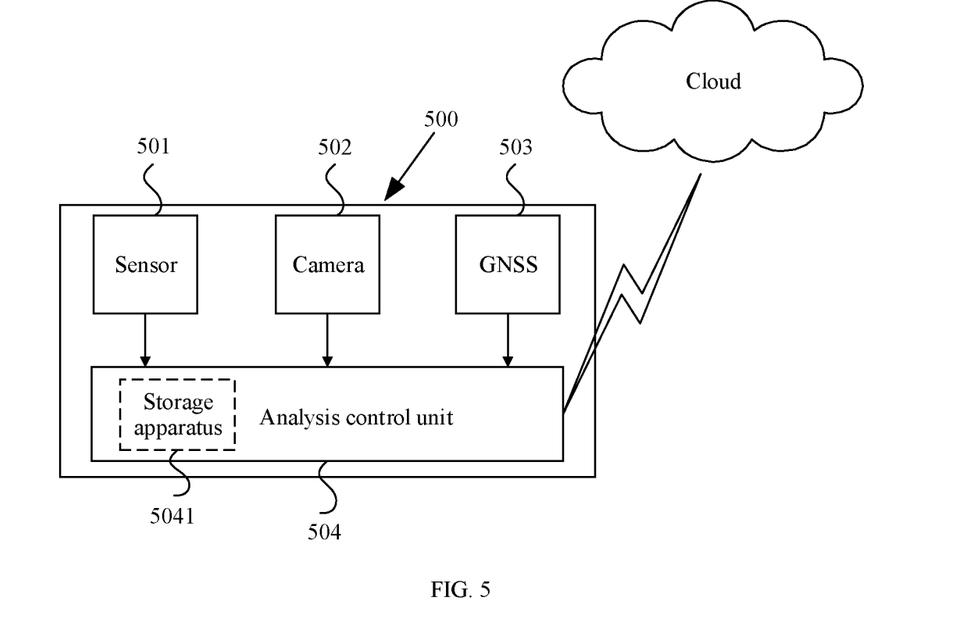
FIG. 5 is a schematic diagram of an architecture of a vehicle self-protection system according to an embodiment of the present disclosure.

Refer to FIG. 5. In some embodiments, compared with the vehicle self-protection system 400 in FIG. 4, a vehicle self-protection system 500 further includes a storage apparatus 5041 disposed on an analysis control unit 504. The storage apparatus 5041 may store historical information of the vehicle. The vehicle self-protection system 500 shown in FIG. 5 may implement a function consistent with that of the vehicle self-protection system 400 in the foregoing embodiment.

Figure 6:
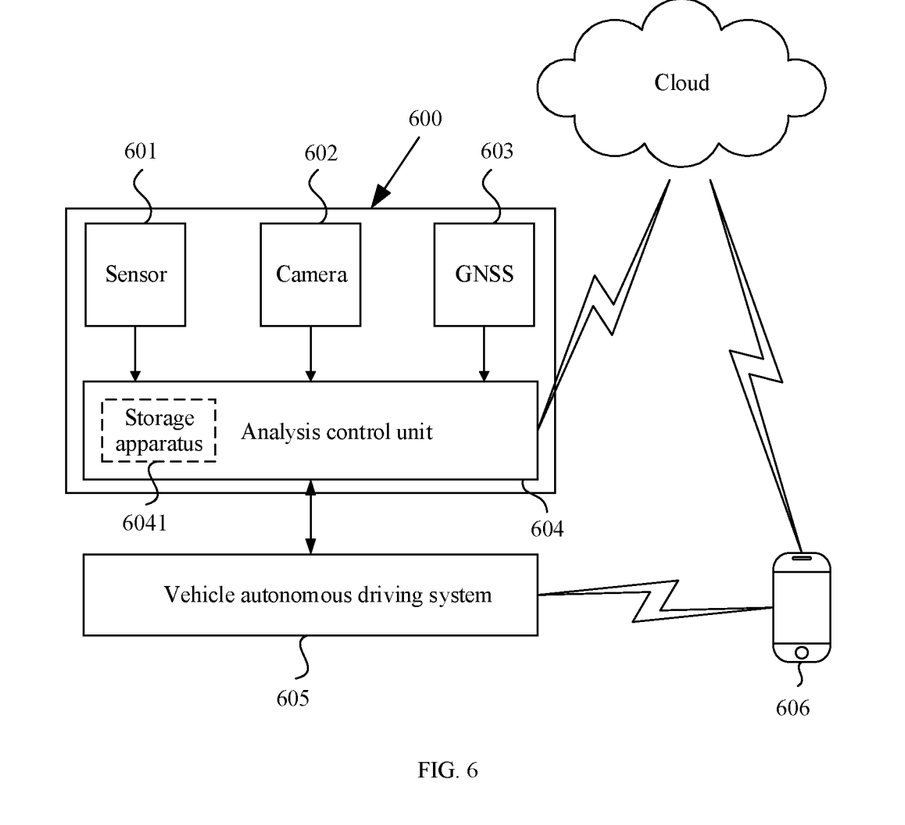
FIG. 6 is a schematic diagram of an architecture of a vehicle self-protection system according to an embodiment of the present disclosure.

Refer to FIG. 6. In some embodiments, compared with the vehicle self-protection system 500 shown in FIG. 5, a vehicle self-protection system 600 is communicatively connected to an autonomous driving system 605. The autonomous driving system 605 is communicatively connected to a mobile phone 606 of the vehicle owner, and the vehicle self-protection system 600 or the cloud may send risk level information of the vehicle to the mobile phone 606 of the vehicle owner.

After obtaining the risk level, the vehicle self-protection system 600 may perform a corresponding operation based on the risk level. The corresponding operation is consistent with various implementations recorded in step 203. The autonomous driving operation of the vehicle may be performed by the autonomous driving system 605.

Figure 7:
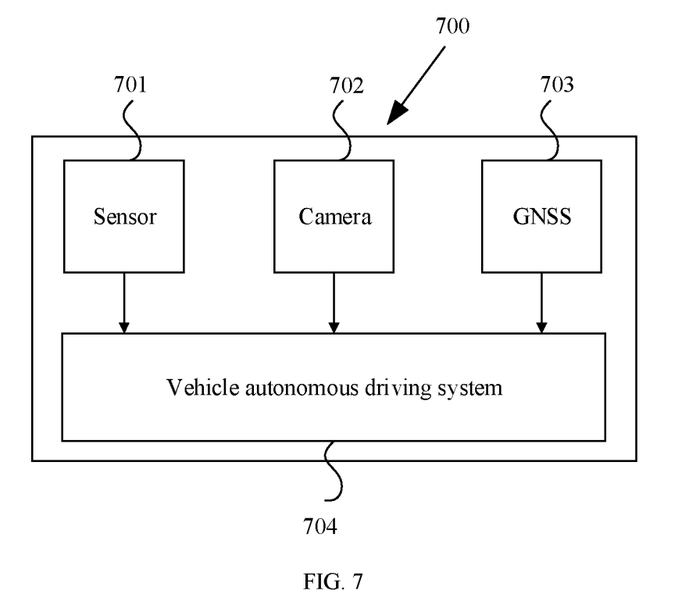
FIG. 7 is a schematic diagram of an architecture of a vehicle self-protection system according to an embodiment of the present disclosure.

Refer to FIG. 7. In some embodiments, a vehicle self-protection system 700 includes: a sensor 701, where the sensor may include a temperature sensor, a tire pressure sensor, a water immersion sensor, a sound sensor, and the like; a camera 702, where there may be a plurality of cameras; a GNSS 703; and an autonomous driving system 704 communicatively connected to the sensor 701, the camera 702, and the GNSS 703.

The sensors 701 are configured to obtain temperature information, tire pressure information, water immersion information, and sound information of the vehicle. The camera is configured to obtain image and video information inside and outside the vehicle. The GNSS is configured to obtain location information of the vehicle.

The ambient environment information of the vehicle obtained by the sensor 701, the camera 702, and the GNSS 703 may be transmitted to an autonomous driving system 704. The autonomous driving system 704 may further obtain historical information of the vehicle from the vehicle (for example, obtain from a storage apparatus disposed on the vehicle to record a historical behavior of the vehicle). The autonomous driving system 704 determines a current risk level of the vehicle based on the obtained ambient environment information of the vehicle and/or the historical information of the vehicle, and performs a corresponding operation based on the risk level. The determining of the risk level and the corresponding operation are basically the same as the processes described in embodiments of step 202.

Figure 8:
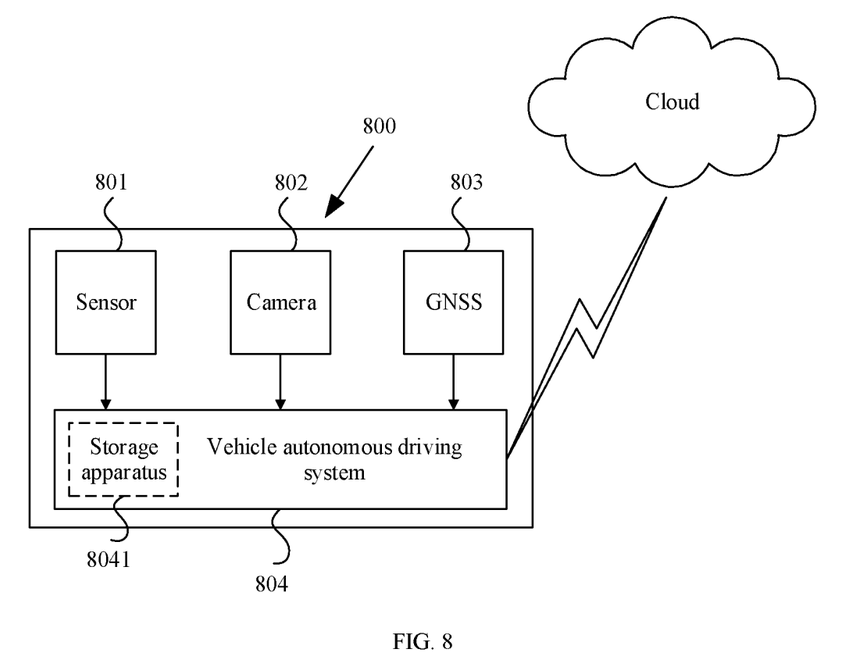
FIG. 8 is a schematic diagram of an architecture of a vehicle self-protection system according to an embodiment of the present disclosure.

Refer to FIG. 8. In some embodiments, a vehicle self-protection system 800 that is the same as the vehicle self-protection system 700 in FIG. 7 may communicate with the cloud. Information (for example, current location information of the vehicle and/or historical information of the vehicle) of the vehicle may be transmitted to the cloud. A process in which the vehicle self-protection system 800 interacts with the cloud and a process in which the risk level is determined are consistent with the implementations recorded in step 202. After the risk level is determined, the autonomous driving system of the vehicle or the cloud may further perform an operation corresponding to the risk level. The determining of the risk level and the corresponding operation are basically the same as the processes described in embodiments of step 202.

Figure 9:
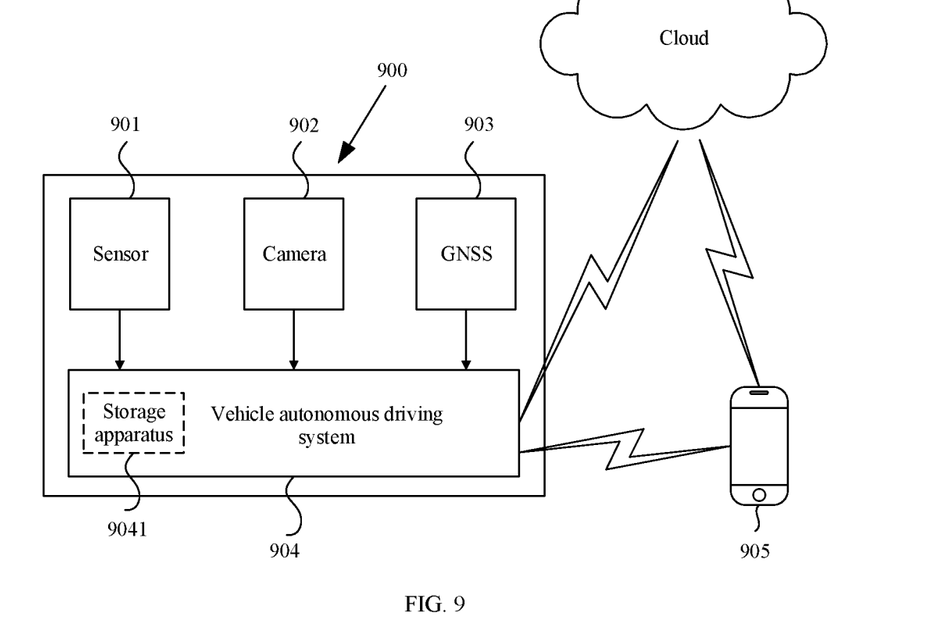
FIG. 9 is a schematic diagram of an architecture of a vehicle self-protection system according to an embodiment of the present disclosure.

Refer to FIG. 9. In some embodiments, compared with the vehicle self-protection system 800 shown in FIG. 8, a vehicle self-protection system 900 is communicatively connected to a mobile phone 905 of the vehicle owner. The vehicle or the cloud may send risk level information of the vehicle to the mobile phone 905 of the vehicle owner.

After obtaining the risk level, the vehicle self-protection system 900 may perform a corresponding operation based on the risk level. The corresponding operation is consistent with various implementations recorded in step 203.

In some embodiments, an autonomous vehicle is provided. The autonomous vehicle may include the vehicle self-protection system provided in the foregoing embodiments, and implement functions implemented in the foregoing embodiments.

Figure 10:
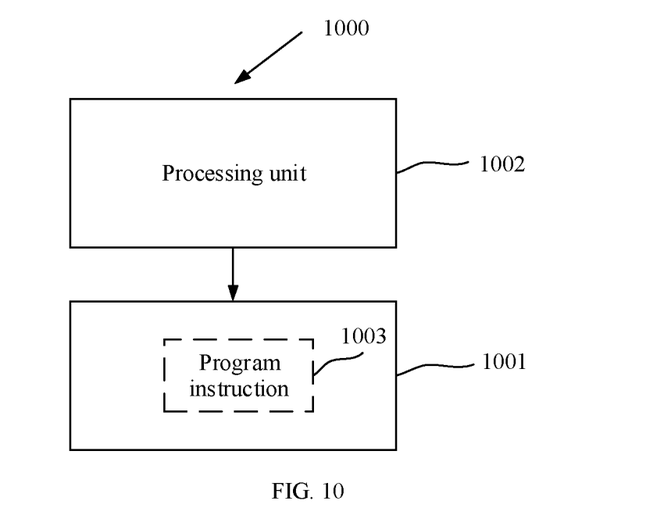
FIG. 10 is a schematic diagram of a vehicle self-protection apparatus according to an embodiment of the present disclosure.

In some embodiments, as shown in FIG. 10, a vehicle self-protection apparatus 1000 is provided. The vehicle self-protection apparatus 1000 includes a storage unit 1001 and a processing unit 1002. The storage unit 1001 is configured to store program instructions 1003, and the processing unit 1002 is configured to execute the program instructions 1003 in the storage unit 1001 to implement functions implemented in the foregoing embodiments.

In some embodiments, a computer-readable storage medium is provided, where the computer-readable storage medium stores program code. When the program code is executed by a computer or a processor, various functions in the foregoing embodiments can be implemented. The computer-readable storage medium may be the storage unit 1001 shown in FIG. 10.

Embodiments of the present disclosure provide a vehicle self-protection method and system, and an autonomous driving vehicle. A level of a risk faced by a vehicle is determined by obtaining and analyzing ambient environment information of the vehicle and historical information of the vehicle, and a corresponding operation is performed based on the risk level. The corresponding operation may include notifying a vehicle owner; leaving the current location under remote control of the vehicle owner when a remote control command from the vehicle owner is obtained; or leaving the current location through autonomous driving when the vehicle owner cannot be reached, and notifying the vehicle owner of a current location of the vehicle after the autonomous driving is completed. In the technical solutions of the present disclosure, when a vehicle faces an actual environment danger, the vehicle can independently perform a corresponding protection measure, so that property of an owner can be protected and a personal safety threat in some cases can be reduced. The technical solutions of the present disclosure have positive significance for property and personal protection in a trend of autonomous driving and electrification. For a pure electric vehicle or a plug-in hybrid vehicle with a large battery pack capacity, safety of the battery pack is greatly affected by an environment. For example, the battery pack is prone to spontaneous combustion in a case of overheat, and electricity leakage may occur in the battery pack when the vehicle is immersed in water. The technical solutions of the present disclosure can better prevent risks that may occur in the battery pack in various environments, to reduce a property loss and a personal safety risk, and have a positive effect on promotion and popularization of autonomous driving.

In the specification, claims, and accompanying drawings of the present disclosure, the terms "first", "second", "third", "fourth", and the like (if existent) are intended to distinguish between similar objects but do not necessarily indicate a specific order or sequence. It should be understood that the data termed in such a way is interchangeable in proper circumstances, so that embodiments described herein can be implemented in other orders than the order illustrated or described herein. In addition, the terms "include", "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In embodiments provided in the present disclosure, it should be understood that the disclosed system, apparatus, and method may be implemented in another manner. For example, the described apparatus embodiments are merely examples. For example, division into units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, service units in embodiments of the present disclosure may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of the present disclosure. The storage medium includes any medium that can store program code, such as a Universal Serial Bus (USB) flash drive, a removable hard disk, a read-only memory (ROM), a random access memory (RAM), a magnetic disk, or an optical disc.

A person skilled in the art should be aware that in the foregoing one or more examples, the services described in the present disclosure may be implemented by hardware, software, firmware, or any combination thereof. When being implemented by hardware, the foregoing services may be stored in a computer-readable medium or transmitted as one or more instructions or code in the computer-readable medium. The computer-readable medium includes a computer storage medium and a communications medium. The communications medium includes any medium that enables a computer program to be transmitted from one place to another place. The storage medium may be any available medium accessible to a general-purpose computer or a special-purpose computer.

In the foregoing specific implementations, the objectives, technical solutions, and the benefits of the present disclosure are further described in detail. It should be understood that the foregoing descriptions are merely specific implementations of the present disclosure.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of the present disclosure.

What is claimed is:

1. A method implemented by a vehicle autonomous driving system, the method comprising:
obtaining ambient environment information and historical information of a parked vehicle;
determining a risk level based on at least the ambient environment information and the historical information, wherein the risk level is one of a low-risk level, a medium-risk level, or a high-risk level;
performing an operation based on the risk level, wherein the operation comprises sending a notification to a vehicle owner of the parked vehicle when the risk level is the low-risk level, leaving a current location under remote control of the vehicle owner when the risk level is the medium-risk level, and leaving the current location through autonomous driving when the risk level is the high-risk level, and wherein the risk level is determined to be the high-risk level at least once; and
sending, when the operation is leaving the current location through autonomous driving, a notification to the vehicle owner after the operation is completed.

2. The method according to claim 1, wherein the ambient environment information comprises at least one of the current location of the parked vehicle, a cabin temperature of the parked vehicle, an external temperature of the parked vehicle, a tire pressure of the parked vehicle, a water immersion depth, or an intensity of a sound around the parked vehicle.

3. The method according to claim 1, wherein the historical information comprises historical driving information and historical parking information of the parked vehicle.

4. The method according to claim 3, further comprising:
obtaining information from a cloud, wherein the information comprises uploaded information from a second vehicle, related statistical information of the current location of the parked vehicle, and current weather information; and
further determining the risk level based on the information.

5. The method according to claim 1, wherein when the operation is leaving the current location through autonomous driving, the method further comprises determining a target parking location based on the historical information.

6. The method according to claim 5, wherein the target parking location comprises a parking area near a residential location or a working location of the vehicle owner.

7. The method according to claim 1, wherein the ambient environment information comprises a cabin temperature of the parked vehicle.

8. A system comprising:
a sensor, wherein the sensor comprises at least one of a temperature sensor, a tire pressure sensor, a water immersion sensor, or a sound sensor;
a camera;
a positioning apparatus; and
an analysis controller communicatively connected to the sensor, the camera, and the positioning apparatus, wherein the analysis controller is configured to:
obtain ambient environment information of a parked vehicle from the sensor, the camera, and the positioning apparatus;
obtain historical information of the parked vehicle;
determine a risk level based on at least the ambient environment information and the historical information, wherein the risk level is one of a low-risk level, a medium-risk level, or a high-risk level;
determine an operation based on the risk level, wherein the operation comprises sending a notification to a vehicle owner of the parked vehicle when the risk level is the low-risk level, leaving a current location under remote control of the vehicle owner when the risk level is the medium-risk level, and leaving the current location through autonomous driving when the risk level is the high-risk level, and wherein the risk level is determined to be the high-risk level at least once; and send, when the operation is leaving the current location through autonomous driving, a notification to the vehicle owner after the operation is completed.

9. The system according to claim 8, further comprising a storage apparatus configured to store the historical information.

10. The system according to claim 8, wherein the ambient environment information comprises at least one of the current location of the parked vehicle, a cabin temperature of the parked vehicle, an external temperature of the parked vehicle, a tire pressure of the parked vehicle, a water immersion depth, or an intensity of a sound around the parked vehicle.

11. The system according to claim 10, wherein the historical information comprises historical driving information of the parked vehicle and historical parking information of the parked vehicle.

12. The system according to claim 11, wherein the analysis controller is further configured to:

communicate with a cloud;

obtain information stored on the cloud, wherein the information comprises uploaded information from a second vehicle, related statistical information of the current location of the parked vehicle, and current weather information; and further determine the risk level based on the information.

13. The system according to claim 12, wherein the analysis controller is further configured to transmit the ambient environment information and the historical information to the cloud for enabling the cloud to determine the risk level.

14. The system according to claim 13, wherein the risk level is based on the ambient environment information, the historical information, the information uploaded by the second vehicle, the related statistics information of the current location, and the current weather information.

15. The system according to claim 14, further comprising an autonomous driving system of the vehicle communicatively coupled to the analysis controller, wherein the autonomous driving system is configured to control the parked vehicle based on the operation.

16. A computer program product comprising computer-executable instructions stored on a non-transitory computer-readable storage medium, the computer-executable instructions when executed by a processor of an apparatus, cause the apparatus to:

obtain ambient environment information and historical information of a parked vehicle;

determine a risk level based at least on the ambient environment information and the historical information, wherein the risk level is one of a low-risk level, a medium-risk level, or a high-risk level;

perform an operation based on the risk level, wherein the operation comprises sending a notification to a vehicle owner of the parked vehicle when the risk level is the low-risk level, leaving a current location under remote control of the vehicle owner when the risk level is the medium-risk level, and leaving the current location through autonomous driving when the risk level is the high-risk level, and wherein the risk level is determined to be the high-risk level at least once; and send, when the operation is leaving the current location through autonomous driving, a notification to the vehicle owner after the operation is completed.

17. The computer program product of claim 16, wherein the computer-executable instructions when executed by the processor of the apparatus further cause the apparatus to:

obtain information from a cloud, wherein the information comprises information uploaded by a second vehicle to the cloud, related statistical information of the current location of the parked vehicle, and current weather information, and wherein the risk level is further based on the information.

18. The computer program product of claim 16, wherein the historical information of the parked vehicle comprises historical driving information of the vehicle and historical parking information of the parked vehicle.

* * * * *